United States Patent
Oulman

[15] 3,696,852
[45] Oct. 10, 1972

[54] FLEXING TIRE TRACTION DEVICE

[72] Inventor: Loren C. Oulman, 946 Twenty-third Avenue N.E., Minneapolis, Minn. 55418

[22] Filed: Aug. 3, 1970

[21] Appl. No.: 60,395

[52] U.S. Cl. ................................................152/220
[51] Int. Cl. ..............................................B60c 27/04
[58] Field of Search.............152/220, 213, 219, 225

[56] References Cited

UNITED STATES PATENTS

| | | |
|---|---|---|
| 2,222,986 | 11/1940 | Snyder......................152/220 |
| 2,705,520 | 4/1955 | Erving.......................152/219 |
| 2,008,210 | 7/1935 | Hipkins......................152/220 |

*Primary Examiner*—James B. Marbert
*Attorney*—L. A. MacEachron

[57] ABSTRACT

A plurality of traction devices that are rigid fit the profile of a flexing tire and so are gripped by it as it flexes; the units are held in close proximity to the tire by a wire rope structure that takes full advantage of the strength of wire rope.

4 Claims, 5 Drawing Figures

PATENTED OCT 10 1972
3,696,852
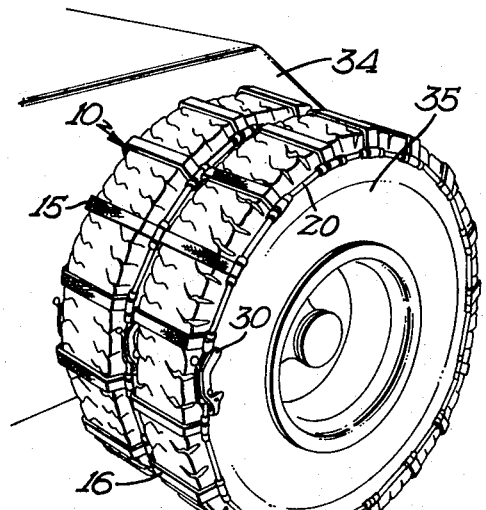
FIG 1
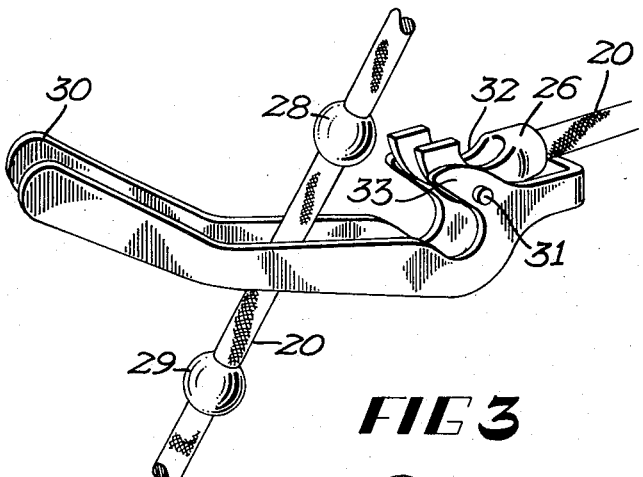
FIG 3
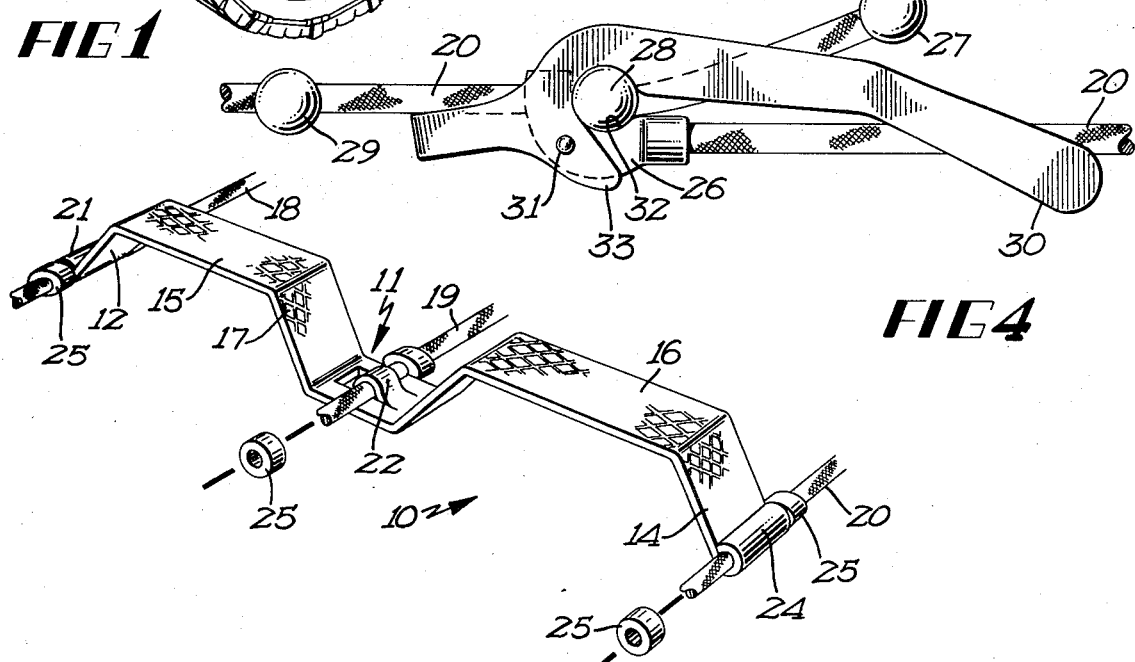
FIG 4
FIG 2
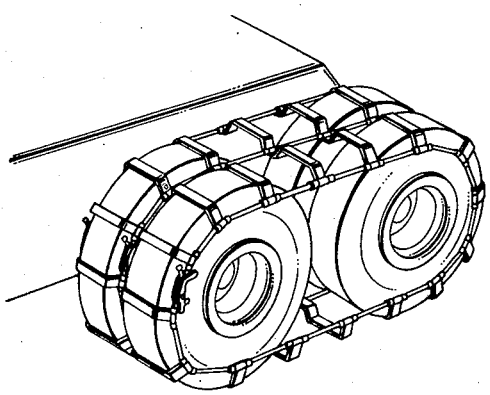
FIG 5
INVENTOR.
LOREN C. OULMAN

FLEXING TIRE TRACTION DEVICE

BACKGROUND OF THE INVENTION

Traction devices of various kinds for flexing tires on vehicles have been known for years in areas where the winters with snow and ice or the springs with mud and other low traction road surfaces are a real problem. All of the known devices are of help in over coming the low traction problem, but all known to me have also had drawbacks. Ordinary tire chains, for example, are both difficult to put on the wheel and are very susceptible of damage if used without proper mounting. They also seem possessed by demons when one is trying to untangle them unless they are stored with great care, as, for example, when they are hung stretched out as one often sees on trucks. Chains are also rather easily destroyed by reckless use even if mounted with great care. When a tire chain breaks, it often inflicts substantial damage on the vehicle on which it was being used at the time of the breakage. Link tire chains are also rather heavy and definitely limit the reasonable speed at which the vehicle using them should be operated.

Individual traction links that use various strap means to hold them on the wheel avoid some of the problems connected with full chains, but the amount of traction they offer is rather limited. Trucks that operate in the mountains would find them very inadequate. They need major assistance when road conditions are bad.

In short, all now known traction devices for highway use with rubber tired vehicles leave many unsolved problems from the users point of view. In this context, my invention is aubstantial improvement over the devices that have been available up to the present time.

SUMMARY OF THE INVENTION

The invention uses a formed bar or plate of metal as the traction improving device, and it is formed to a close fit to the profile of the tire with which it is to be used near the tread portion of the tire. When the tire flexes under the weight of the vehicle and its load, the tire profile adjacent the tread in contact with the road way is distorted and forcefully engages and grips the traction element as a result. The traction elements are secured together in spaced relationship by wire rope with stops arranged along its length. The manner of securing the traction plates to the wire ropes makes replacement of a damaged plate quite feasible even in the field.

On one end of the wire rope is a toggle latch device which coacts with a series of balls that are swaged onto the other end of the wire rope to permit tightening of the device and securing it in a tightened condition about the tire of a vehicle. The wire rope also tends to give the structure a non-snarling character when it is rolled up for storage. As the wire rope is substantially stronger than chain for a given weight, the structure will withstand very hard use without damage. When used with dual tires, a depressed center portion of the traction bars serves as a guide to keep the device aligned with the wheels.

OBJECTS OF THE INVENTION

In the context of the background and summary of the invention, the objects of the invention are to provide:

1. a particularly rugged tire traction improving device;
2. a flexing tire traction device for hgihway use that takes maximum advantage of the character of wire rope;
3. a flexing tire traction device that relies on the interaction of the traction elements with the flexing tire for the grip of the traction device on the tire;
4. a flexing tire highway traction device that is substantially lower in weight than devices it replaces;
5. a tire traction device that can be repaired to at least some extent in the field and without special tools;
6. a flexing tire highway traction device that is more easily mounted than tire chains;
7. a flexing tire traction device that is self aligning when used with dual tires;
8. a flexing tire highway traction device that is smoother riding than previously known traction devices; and
9. a flexing tire traction device that can be stored with a minmum of effort, similarly removed from storage and with less soiling of the hands of the operator than with conventional devices.

DESCRIPTION OF THE DRAWINGS

In the drawings:

FIG. 1 is a perspective view of the traction device mounted on the driving wheels of a vehicle.

FIG. 2 is a fragmentary view of a wire rope and one traction device to show how the latter is secured to the former, the device is shown at a larger scale than FIG. 1, FIG. 3 is a perspective view of one fastening device and a fragment of each end of the wire rope used to secure the traction devices into a group; it is shown in substantially full size, FIG. 4 is a side elevation of the structure shown in FIG. 3 but in the latched position, and FIG. 5 is a perspective view of the device installed on a tandem dual driving wheel arrangement and shown in a smaller scale than FIG. 1.

DETAILED DESCRIPTION OF THE INVENTION

Referring first to FIG. 2, the traction device of the invention is indicated generally at 10. It is formed from a plate of steel and formed to fit the profile of the tire in section near its tread area. Another way of saying this is the plate fits the profile of the tire when the plate extends normal to the tread. The device shown in FIG. 2 is for tires on dual wheels and so has a center area 11 and end portions 12 and 14 that bend down as shown in FIG. 2 relative to the traction surface 15 and 16. A gripping pattern as shown at 17 may be formed on the surfaces of the traction plates. Such a pattern will provide superior traction on very slick surfaces such as ice. This is particularly desireable to maintain sideways traction. In snow or mud, the center portion 11 and the end portion 12 and 14 will serve this function.

Center section 11 also serves guide the traction devices to keep them centered on the dual wheels. This is particularly valuable when the structure is used on tandem wheels as seen in FIG. 5.

Wire ropes 18, 19 and 20 serve to connect all the traction plates together into a unit and also to hold them on the tire. The plates are secured at right angles to or normal to the wire rope by portions of the plates that are bent around and embrace the wire ropes as shown at 21, 22 and 24. Collars or stops as shown at 25 by way of example, are crimped or swaged onto the rope and hold the traction devices in spaced relation along the ropes. Since the force of driving the vehicle is transmitted from the tire to the traction device by means of the gripping interaction of tire as it flexes with the formed plate, there is relatively little force applied to the stops on the wire rope. It should also be noted that the stops engage the edges of the plate 10 and that portions 21, 22 and 24 merely old the plate in contact with the stops. This structure is more than adequate to keep the plates in place on the wire rope when the plates are not in driving contact with a road way.

A major advantage of this means of securing the plates to the wire rope is the ease with which a damaged plate can be removed and replaced. The vehicle driver merely needs to pry open the elements 21, 22 and 24, as with a screwdriver, replace the damaged plate and clinch the new one in place. The clinching can be accomplished with a hammer.

When the device is used with dual wheels, as shown here, the center portion of the plates serve as a guide to keep the plates aligned with the tires. This is particularly true on large trucks where there are often dual tandem driving wheels as shown in FIG. 5.

The means for holding the plates tightly on a tire are the wire ropes. The ends of the wire ropes must be secured together, of course, and this is accomplished with toggle latches. In FIG. 3 the latch is seen to include a a yoke member 26 which is attached to the end of the wire rope in any suitable manner as by swaging. On the other end of each wire rope are swaged, at suitable intervals, the balls 27, 28 and 29. A bifurcated toggle lever 30 is pivoted, as at 31, to the yoke 26. Lever 30 is provided with the ears 33 to aid in unlatching the device as will be explained under operation. Yoke 26 has the hooks 32 which will receive one of the balls 27–29. The hooks extend up past the center line of the balls as appears clearly in FIG. 4. When a ball is in the latch as shown in FIG. 4, the force applied to the wire rope is carried almost entirely by the yoke 26 and the lever 30 is primarily a means for latching and unlatching the structure.

In FIG. 1 the device is shown mounted on a dual wheel vehicle 34 with flexing tires 35 on each wheel. FIG. 5 shows how the same device, but longer, of course, can be applied to dual tandems with good results. It also illustrates how the depressed centers can serve to guide the plates onto the tires.

OPERATION

To mount the device on a tire, the structure is laid out flat on a road surface and the vehicle driven onto it. The two ends then may be swung up and around the tire. The character of wire rope is such that it has a certain stiffness although also flexible. This fact makes the structure easy to swing up over the tire as described. When the structure is in the approsimate position shown in FIG. 1, At least one ball such as 27 will be within reach of the lever 30. As lever 30 is arranged as shown in FIG. 4 by swinging it from the position shown in FIG. 3, tightening force is applied to the wire rope. It may be immediately apparent that the wire ropes are not tight enough. If it is possible to reach the next ball, 28 in FIGS. 3 and 4, it is pulled up tight to this point. Sometimes a device of this sort will loosen after a brief driving of the vehicle. In that case the next ball is engaged and so on until the ropes are snug.

When lever 30 is swung from the position shown in FIG. 4 to that shown in FIG. 3, the ears 33 engage the ball 28 and lift it past the hook 32 of the yoke 26. Thus it is easy to release the device when it is desired to take it off the tire. Once it is released, it can be laid out flat on a road way and the vehicle driven off it. The same character of that makes it easy to swing up over the tire when mounting it also allows it to be rolled up in a non-snarling bundle for storage. In the alternative, it can be doubled or folded in thirds and hung as ordinary tire chains are.

What is claimed is:

1. A traction device for flexing tires comprising the combination of:
   a. Plates formed to fit closely the unflexed profile of the flexing tire with which they will be used and when extending normal to the tread thereof, and
   b. Means for holding said plates in close proximity to the unflexed profile of a flexing tire; said plates also extending normal to the planes of said holding means; said holding means also holding said plates in spaced relation to each other.

2. The traction device of claim 1 in which (b) is wire rope and
   c. spaced means secured to said wire rope serving as stops on it; said plates having portions thereof embracing said wire rope between said stops to hold said stops against the edges of said plates.

3. The traction device of claim 2 in which one end of the wire rope is secured to
   d. a toggle latch, and
   c. balls secured to the other end of said wire rope that cooperate with the toggle latch.

4. The traction device of claim 1 in which said plates each have a pattern formed on the road way engaging portion of it.

* * * * *